J. M. SALADINER.
COTTON PEST POISONER.
APPLICATION FILED JAN. 28, 1920.
1,354,215.
Patented Sept. 28, 1920.
3 SHEETS—SHEET 1.
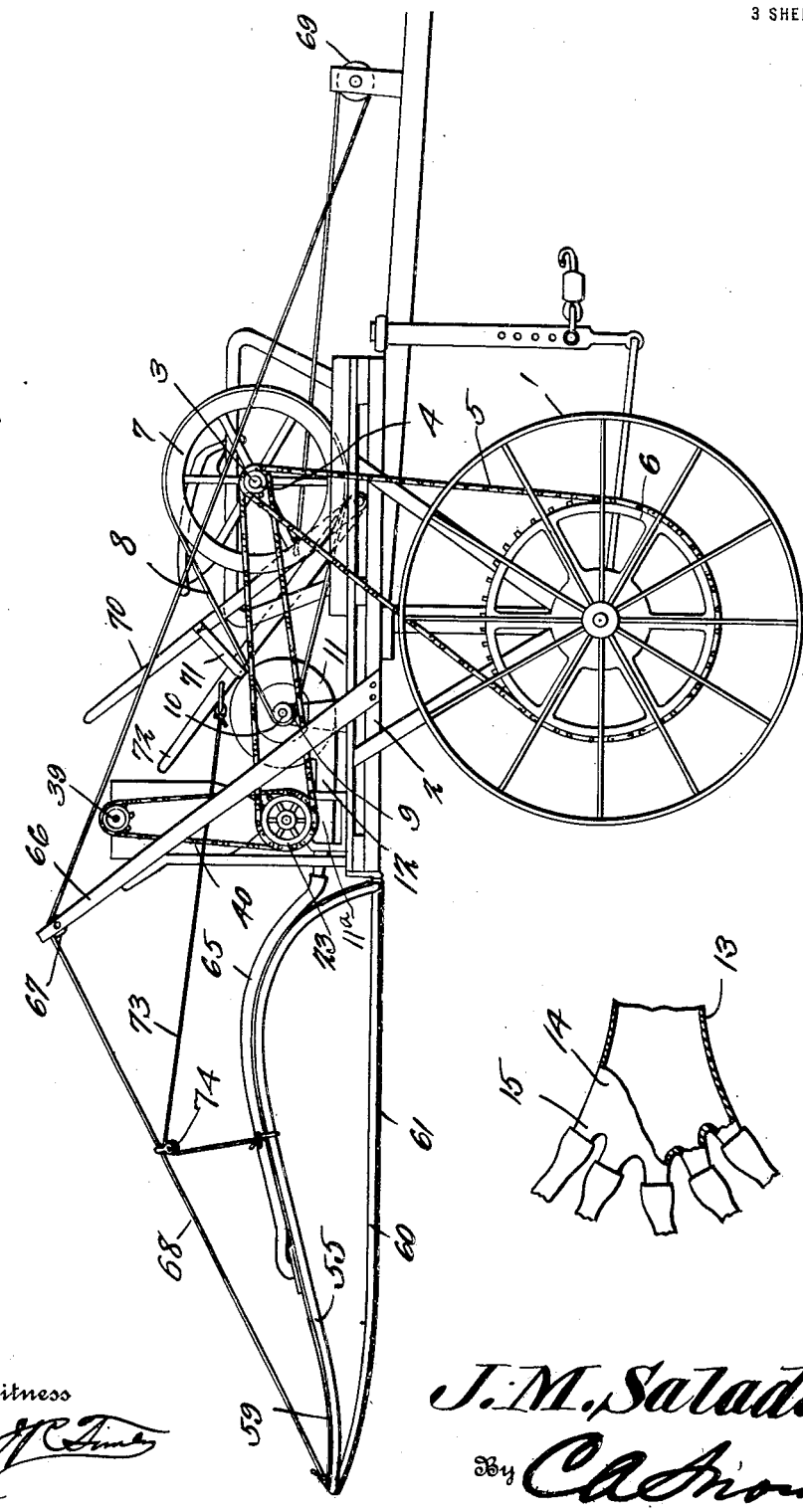
Inventor
J. M. Saladiner
By C. A. Snow & Co.
Attorneys
Witness

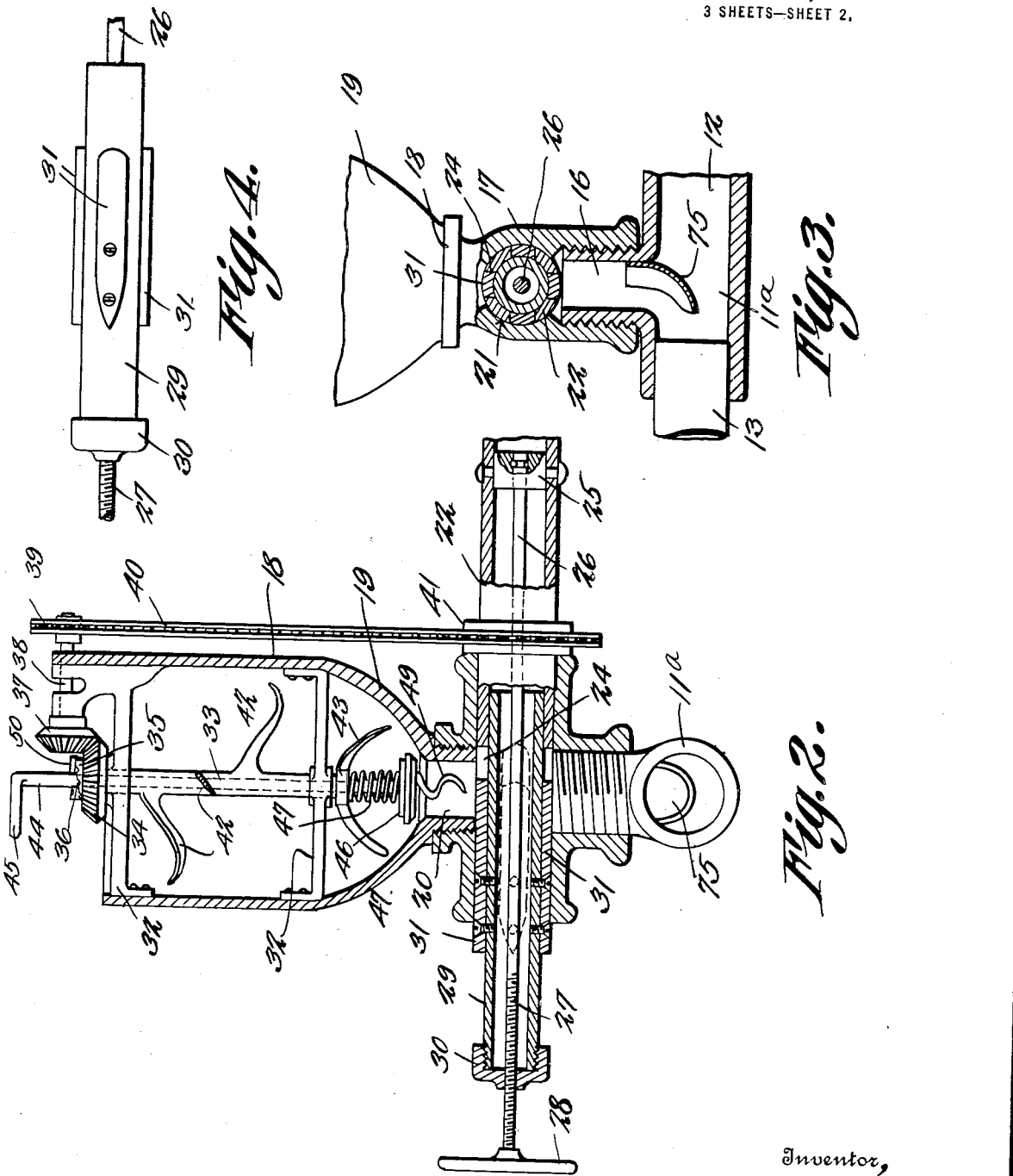

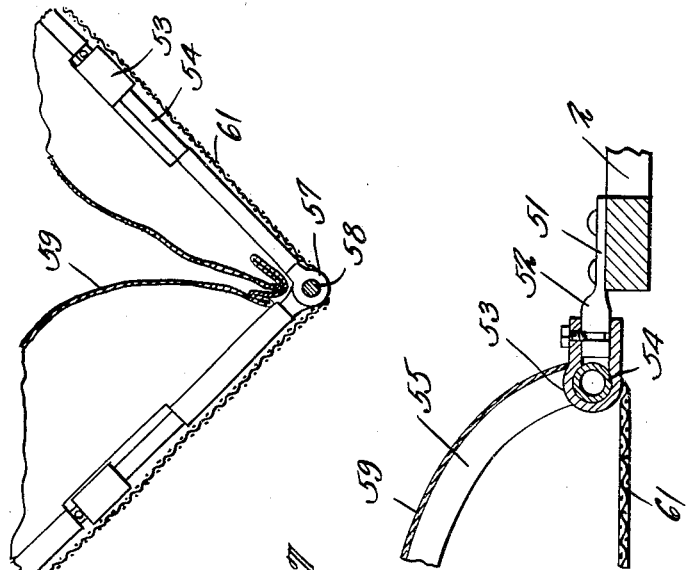
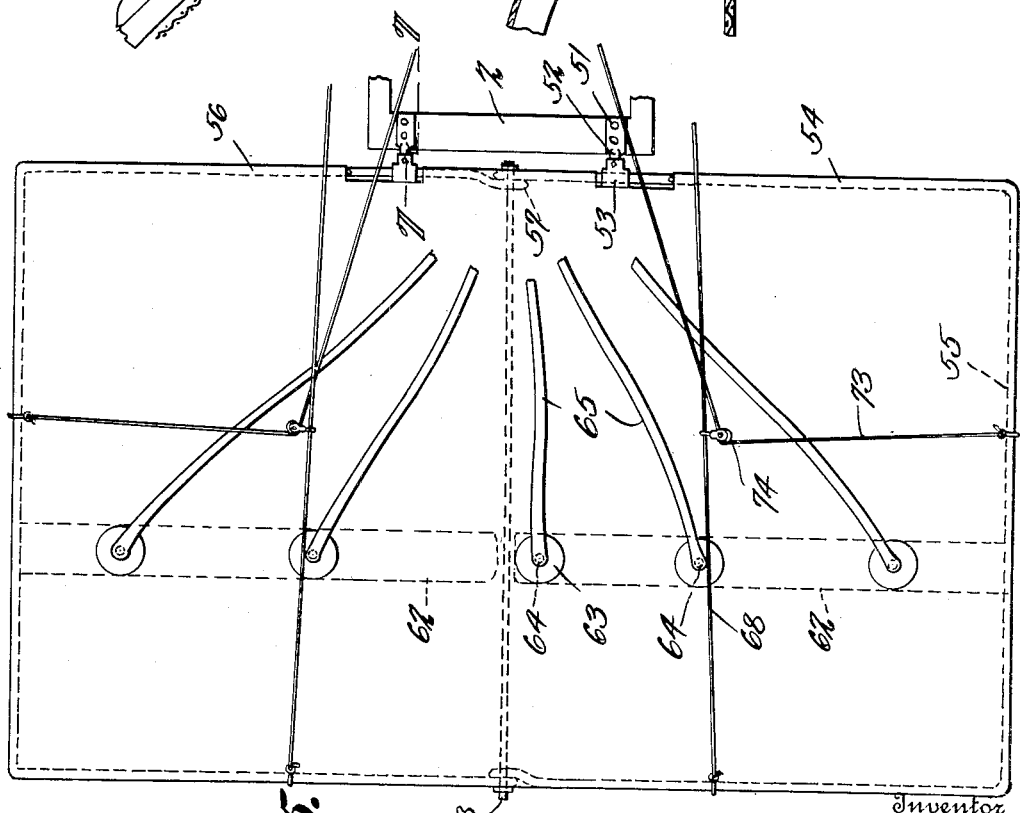

UNITED STATES PATENT OFFICE.

JOSEPH M. SALADINER, OF BRYAN, TEXAS.

COTTON-PEST POISONER.

1,354,215.  Specification of Letters Patent.  Patented Sept. 28, 1920.

Application filed January 28, 1920. Serial No. 354,749.

*To all whom it may concern:*

Be it known that I, JOSEPH M. SALADINER, a citizen of the United States, residing at Bryan, in the county of Brazos and State of Texas, have invented a new and useful Cotton-Pest Poisoner, of which the following is a specification.

This invention relates to an insect destroyer especially designed for use in the treatment of cotton plants for the purpose of destroying the boll weevil or any other insect that may be found thereon although it is to be understood that the machine can be used in the treatment of other plants.

One of the objects of the invention is to provide a machine of this character which can be drawn along the rows and which has means whereby a poisonous substance in the form of a powder can be scattered over the plants, there being means combined with the machine which will allow the powder to be spread over a considerable area and to be directed positively in a downward direction onto the plants.

A further object is to provide adjustable means by which the powder can be dispensed in measured quantities.

A still further object is to provide means for regulating the height of the powder discharging means relative to the plants.

A still further object is to provide means whereby the plants will not become tangled in the apparatus but will allow the machine to pass freely thereover during the dusting operation.

A still further object is to provide a machine the powder distributing portion of which can be folded when not in use so as to allow the machine to pass through a gate or other relatively narrow space.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a side elevation of the machine.

Fig. 2 is a vertical transverse section through the dispensing hopper.

Fig. 3 is a transverse section through the measuring valve and adjacent parts.

Fig. 4 is a detail view of the measuring valve.

Fig. 5 is a plan view of the hood or spreading member of the machine.

Fig. 6 is a transverse section through a portion of the structure shown in Fig. 5 and showing said structure folded.

Fig. 7 is an enlarged section on line 7—7, Fig. 5.

Fig. 8 is a view partly in plan and partly in section of the distributing hand.

Referring to the figures by characters of reference 1 designates supporting wheels on which is mounted a suitable structure 2 including a transverse shaft 3 having a small sprocket 4 adapted to receive motion through a chain 5 from a large sprocket 6 connected to one of the supporting wheels. A pulley 7 rotates with the shaft 3 and transmits motion through a belt 8 to a small pulley 9 connected to the shaft 10 of a blower, not shown, and which is arranged within a casing 11 mounted on the structure 2. This blower discharges into a receiving compartment 11$^a$ through an outlet nozzle 12 and extending from this receiving compartment is a flue 13 opening into a distributing hand 14 having diverging fingers 15, the sides of the hand being concave as shown in Fig. 8. It is to be understood that the total area of the outlet openings in the fingers 15 is greater than that of the transverse area of the flue 13. This is necessary in order to permit the unobstructed flow of air and powder from the flue 13 through the various outlet fingers 15.

The receiving compartment 11$^a$ has an inlet in the top thereof as shown at 16 and mounted on this inlet is a valve casing 17 extending downwardly from the bottom 19 of the hopper 18. The bottom of this hopper is inclined downwardly to the outlet opening 20 in the bottom of the hopper so that powder or other material is free to flow readily to the opening 20 by gravity.

Formed within the valve casing 17 is a cylindrical bore 21 in which a valve is mounted for rotation. This valve includes a tubular shaft 22 extending transversely of the machine and to one end of which is secured a sprocket 23. That portion of the tubular shaft located in line with the outlet opening 20 is provided with a desired number of longitudinal slots 24.

A plug 25 is fixedly secured within the tubular shaft 22 and swiveled in this plug is one end of a rod 26 which has a threaded portion as shown at 27 extending beyond one end of the tubular shaft 22 and provided with a hand wheel 28 or the like. An inner tube 29 is slidably mounted in the tubular shaft 22 and projects beyond one end thereof, said end being provided with a cap 30 which is engaged by the threads 27 on the rods 26. To the outer face of this slidable tube 29 are secured longitudinally extending strips 31 which are movable in the slots 24 and it will be obvious that by rotating the rod 26 the tube 29 can be fed longitudinally in either direction so as to move the strips 31 within the slots 24 and thereby increase or reduce the sizes of the recesses formed by the slots and which recesses are closed at their inner ends by the tube 29, thereby to form measuring pockets.

Transverse supporting strips 32 are secured within the hopper 19 and constitute bearings for a tubular shaft 33 to the upper end of which is secured a beveled gear 34 having a cam 35 provided with notches 36. This beveled gear is in mesh with another gear 37 secured to a transverse shaft 38 arranged on the hopper and which shaft has a sprocket 39 receiving motion through a chain 40 from another sprocket 41 secured to the tubular shaft 22.

Secured to the shaft 33 are lifting fingers or agitators 42 adapted, when the shaft is rotated, to stir up the contents of the hopper 19 and exert a lifting action thereon. To the lower end portion of the tubular shaft 33 are secured additional agitating fingers 43 which operate as depressing elements for the purpose of forcing the contents of the hopper 19 downwardly toward and into the opening 20.

A rod 44 is mounted to slide and rotates within the tubular shaft 33 and is provided at its upper end with a handle 45 whereby it can be manipulated readily. To the lower end of this rod is secured a valve 46 and a spring 47 is mounted on the rod and bears at one end against the valve 46 and at its upper end against the tubular shaft 33 so as thus to hold the valve 46 normally upon its seat, thereby to close the outlet 20. A stirring device in the form of a spiral finger 49 or the like can be extended downwardly from the middle of the valve 46 and into the outlet 20, as shown.

A lug 50 can be extended from the rod 44 and is adapted to ride on the cam 35 and to become seated in one of the notches 36.

Secured to the back portion of the structure 2 are brackets 51 having rearwardly extending pintles 52 on each of which is rotatably mounted a T-fitting 53, as shown in Fig. 7. These T-fittings are equally spaced from and at opposite sides of the longitudinal center of the structure 2 and in each of them is slidably mounted a tubular rod or pipe 54 forming the rear portion of one frame section of the distributing hood of the machine. In Fig. 5 the two frame sections have been indicated at 55 and 56 respectively and the free ends of the pipes forming the cranes of these sections are provided with eyes 57 which lock and are connected by a longitudinally extending pivot rod 58. The side portions of the frame members are curved upwardly and thence downwardly and rearwardly along the lines of a compound curve, as indicated in Fig. 1 and constitute supporting ribs for a covering 59 of duck or other suitable fabric. Ribs similar to the parts 55 shown in Fig. 1 can be located wherever desired between the sides of the crane section and suitably arranged bottom members 60 made of pipe can be provided and constitute backings for a wire netting indicated at 61 and which extends throughout the length and width of the hood. Thus it will be seen that an unobstructed space is provided between the netting 61 and the fabric covering 59.

Spaced metal strips 62 can be secured upon the fabric 59 and in each of these strips are provided outlet openings 63 containing nozzles 64 to which are extended flexible tubes 65 mounted on the respective fingers 15.

Mounted on the structure 2 is a standard 66 having guide pulleys 67 on which are mounted lifting cables 68 attached to the rear portion of the hood and these cables extend forwardly partly around guide pulleys 69 and thence rearwardly to a lever 70. This lever has a guide loop 71 extending rearwardly therefrom in which is movably mounted another lever 72 to which are connected the cables 73. These cables extend rearwardly into engagement with guide pulleys 74 suspended from the cables 68 and then extend laterally to the side portions of the respective sections of the hood. From the foregoing it will be seen that by pulling upon the lever 70 the cables 68 will cause the hood to swing bodily in an upward direction and by pulling on the lever 72 so that it will move toward the lever 70, the cables 73 will pull inwardly on the outer sides of the sections of the hood so as to cause said sections to swing upwardly above the longitudinal rod 58 thereby partly folding the hood and permitting the machine to pass through a gate opening.

In using the machine the poisonous substance in the form of a fine powder is placed in the hopper 19 and the hood at the back end of the machine is adjusted so as to be held close to the tops of the plants to be treated. This hood can be extended downwardly so as to wipe over the tops of the plants without becoming entangled therewith. As the machine moves forward motion will be transmitted to the agitating shaft 33 and to the rotating valve shown in Fig. 4 By rotating the rod 44 the lug 50 will ride upwardly on the cam 35 and drop into a notch, thus opening the valve 46. The agitated poison will gravitate into the pockets or slots 24 as they are brought successively to position under the outlet 20 and as the valve rotates these pockets will carry the measured amounts of powder downwardly and drop them into the receiving compartment 11ª By falling into this compartment the powder will be deflected toward the outlet flue 13 by a deflector 75 and as it passes off of this deflector it will come into the current of air which is directed into the compartment 11ª from the blower. This air blast will force the powder into the distributing hand 14 and thence through the fingers 15 and tubes 65 into the space within the hood. Here the powder will be spread laterally and back and forth so as to enter all portions of the space in the hood and will be dusted downwardly onto the plants under the hood.

What is claimed is:

1. A machine of the class described including a movably supported structure, a hood extending therefrom and having a foraminous bottom adapted to be dragged over plants, means for directing a current of air downwardly into the hood, and means for directing a poisonous substance into said air current.

2. The combination with a movably supported structure and a hood carried thereby and having a foraminous bottom, of means for directing a current of air into the hood, and means for directing a poisonous substance in measured quantities into said air current.

3. The combination with a movably supported structure, and a hood extending therefrom having a foraminous bottom, of a receiving compartment, a container, a continuously rotating measuring element, means for directing material from the container to the measuring element, means for conducting material from the measuring element to the receiving compartment, and means for directing an air blast through the receiving compartment and into the hood.

4. The combination with a movably supported structure and a hood extending therefrom and having a foraminous bottom, of a receiving compartment, a hopper, a measuring valve interposed between the outlet of the hopper and the inlet of the receiving compartment, means for continuously actuating the measuirng element during the movement of the machine, and means for directing an air blast through the receiving compartment to convey the measured material to the interior of the hood.

5. The combination with a movably supported machine and a hood extending therefrom and having a foraminous bottom, of a hopper, a receiving compartment, a slotted valve mounted for rotation between the hopper and receiving compartment, adjustable means for varying the size of the slots to form a pocket of a predetermined size, said pocket constituting means for conveying a measured quantity of material from the outlet of the hopper to the receiving compartment, and means for directing an air blast through the receiving compartment to convey the discharged material into the hood.

6. The combination with a movably supported structure and a hood extending therefrom provided with a foraminous bottom, of a hopper having an outlet, a receiving compartment thereunder, agitating means within the hopper, expelling means within the hopper, a valve normally closing the outlet, a rotatable measuring element between the outlet and the receiving compartment, said measuring element having a slot for the reception of material from the outlet, means for varying the size of the slot to produce a pocket of a predetermined capacity, and means for directing an air blast through the receiving compartment to force the delivered material into the hood.

7. The combination with a movably supported structure and a hood extending therefrom provided with a foraminous bottom, of a hopper having an outlet, a valve normally closing the outlet, combined agitating and lifting means mounted for rotation within the hopper, means mounted for rotation in the hopper for directing material toward the outlet, means for lifting the valve upon its seat, a revoluble measuring and delivering device interposed between the outlet and the receiving compartment, means for varying the capacity of said measuring and delivering device, and means for directing an air blast into the receiving compartment to convey delivered material into the hood.

8. The combination with a movably supported structure and a hood connected thereto and having a foraminous bottom, of a distributing hand having diverging outlet fingers, flexible tubes extending from the fingers and opening through the top of the hood at different distances from the center thereof, a receiving compartment in communication with the distributing hand, means for directing measured quantities of material into the receiving compartment, and means for directing an air blast into said compartment to direct the delivered material into the hand and through the tubes to the hood.

9. The combination with a movably supported structure, of a hood hingedly connected thereto and extending therefrom, said hood having a foraminous bottom, means under the control of the operator for raising and lowering the hood about its hinge connection, means under the control of the operator for folding the hood transversely, a receiving compartment, a container, means for delivering material in measured quantities from the container to the receiving compartment, means for directing an air blast through the receiving compartment to conduct the delivered material to the interior of the hood.

In testimony that I claim the foregoing as my own, I have hereto affixed my signature in the presence of two witnesses.

JOSEPH M. SALADINER.

Witnesses:
   HERBERT D. LAWSON,
   IVY E. SIMPSON.